United States Patent
Kobayashi

(10) Patent No.: US 8,259,796 B2
(45) Date of Patent: Sep. 4, 2012

(54) IMAGE CODING APPARATUS AND IMAGE CODING METHOD

(75) Inventor: Satoru Kobayashi, Bunkyo-ku (JP)

(73) Assignee: Canon Kabushiki Kaisha, Tokyo (JP)

( * ) Notice: Subject to any disclaimer, the term of this patent is extended or adjusted under 35 U.S.C. 154(b) by 1459 days.

(21) Appl. No.: 11/760,397

(22) Filed: Jun. 8, 2007

(65) Prior Publication Data

US 2007/0297508 A1    Dec. 27, 2007

(30) Foreign Application Priority Data

Jun. 23, 2006 (JP) ................................. 2006-174379

(51) Int. Cl.
H04N 7/12 (2006.01)
(52) U.S. Cl. .......... 375/240.04; 375/240.06; 375/240.02
(58) Field of Classification Search .............. 375/240.04
See application file for complete search history.

(56) References Cited

U.S. PATENT DOCUMENTS 6,075,819 A * 6/2000 Saw .............................. 375/240
2006/0093032 A1 5/2006 Shindo
2012/0002725 A1* 1/2012 Kazui ...................... 375/240.12
2012/0063513 A1* 3/2012 Grange et al. ........... 375/240.13

FOREIGN PATENT DOCUMENTS

| JP | 06-268983 A | 9/1994 |
| JP | 07-115651 A | 5/1995 |
| JP | 8-18952 A | 1/1996 |
| JP | 11-196424 A | 7/1999 |
| JP | 2006-135557 A | 5/2006 |

OTHER PUBLICATIONS

Fundamentals of Multimedia, slide pp. 1-40, Chapter 11, Chapter 11, MPEG Video Coding—MPEG-1 and 2, Li & Drew, Prentice Hall 2003.*

* cited by examiner

Primary Examiner — David Y Jung
(74) Attorney, Agent, or Firm — Canon U.S.A., Inc. IP Division

(57) ABSTRACT

An image coding apparatus calculates an image change rate with respect to input image data, predicts an average activity appropriate for a coding target picture that is included in the input image data based on the image change rate, and normalizes an activity using the predicted value of the average activity. Based on the normalized activity, the image coding apparatus performs a quantization of the image data.

17 Claims, 11 Drawing Sheets

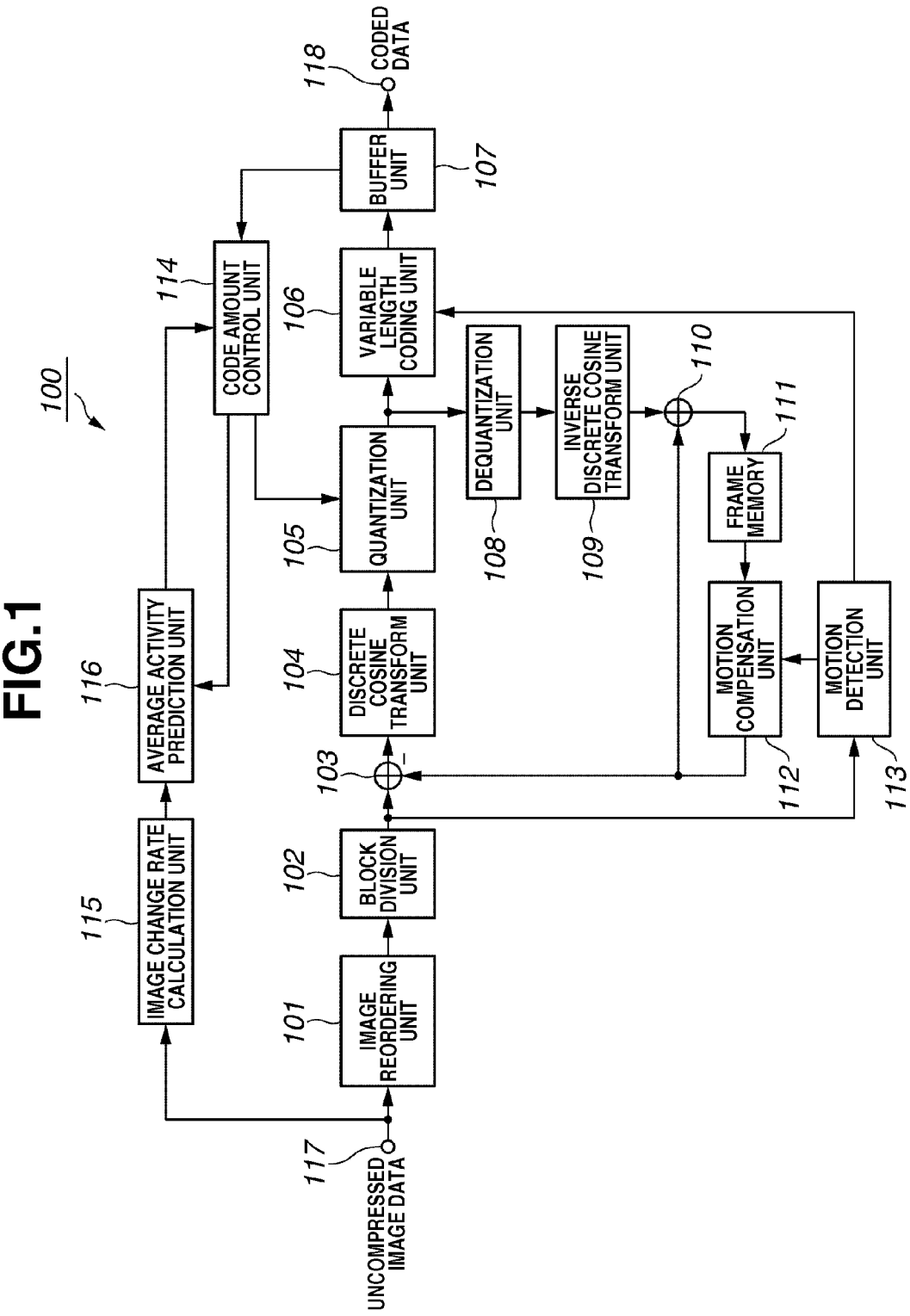

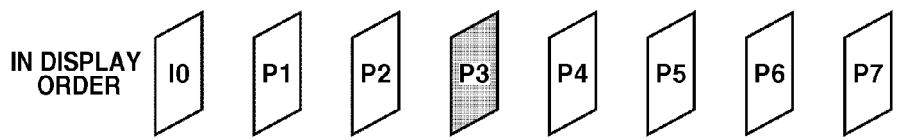
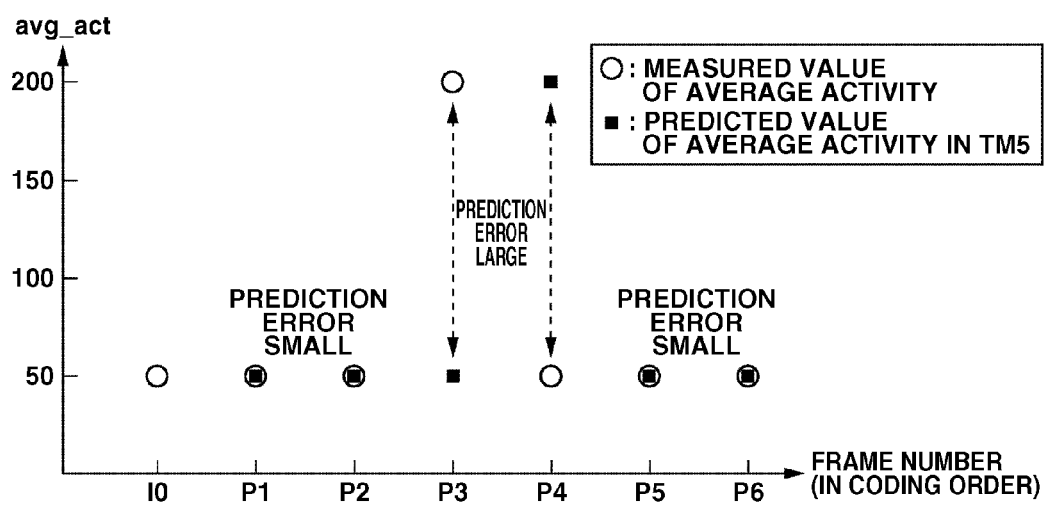
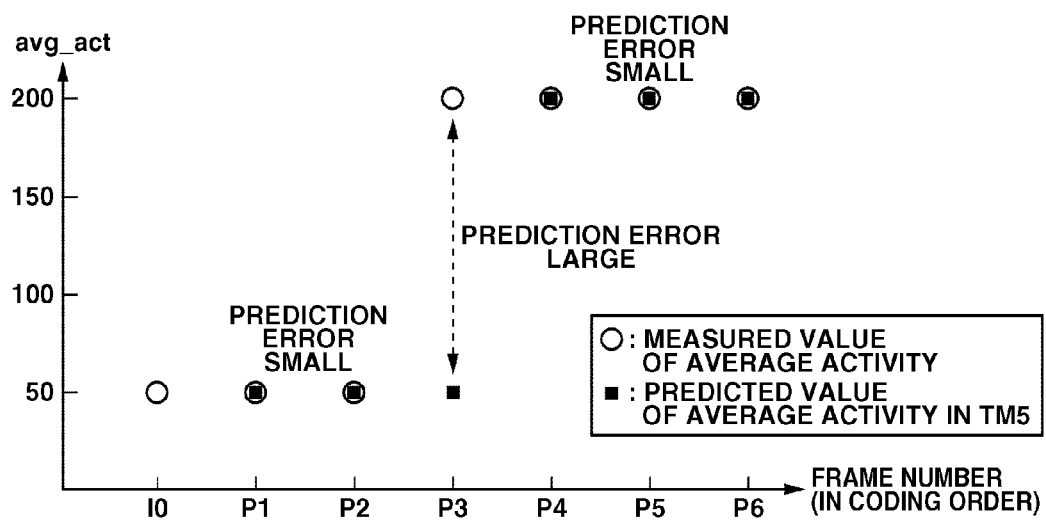

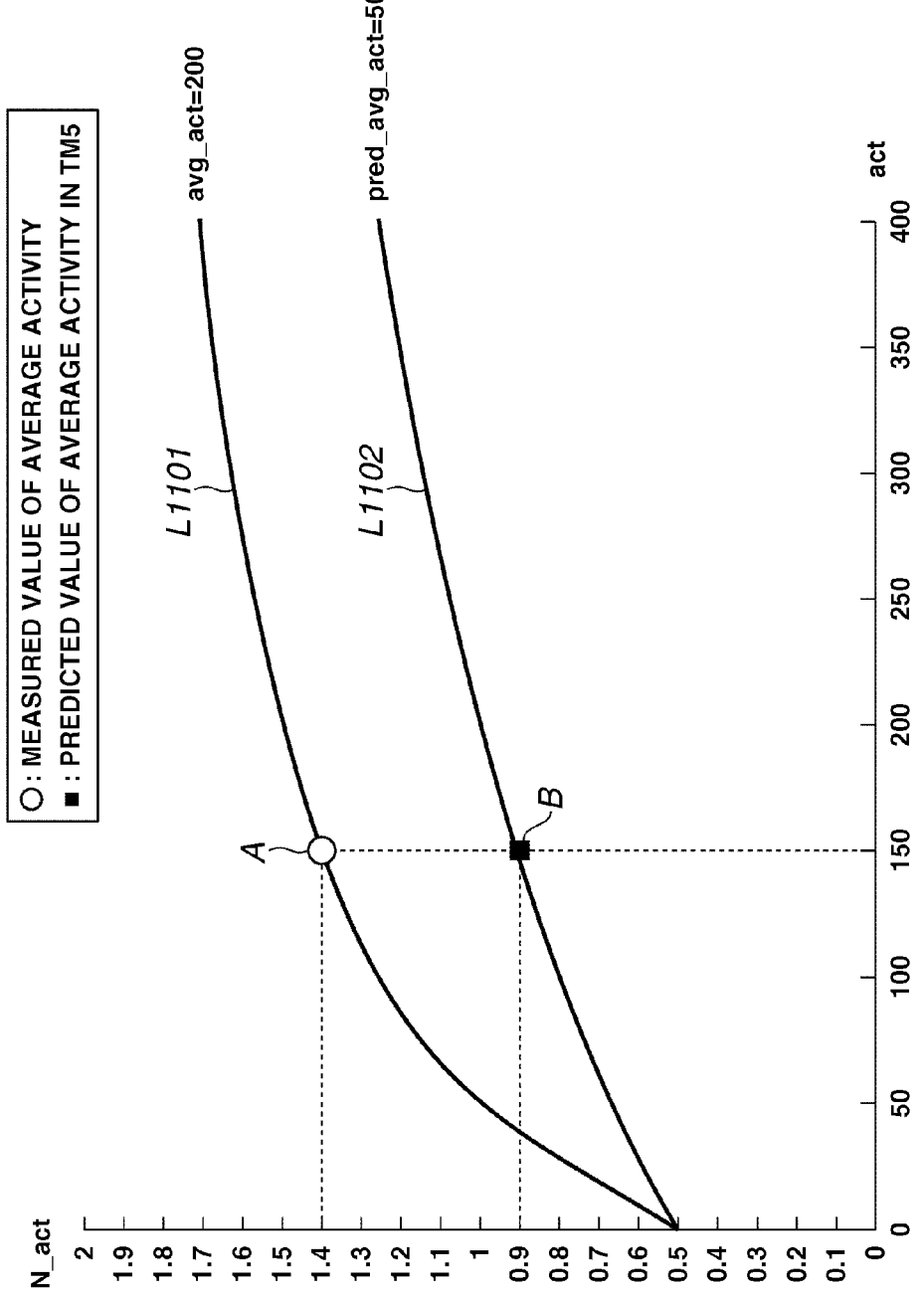

IMAGE CODING APPARATUS AND IMAGE CODING METHOD

BACKGROUND OF THE INVENTION

1. Field of the Invention

The present invention relates to an image coding apparatus and an image coding method. More particularly, the present invention relates to a technique used to improve coding efficiency of the image coding apparatus in a case where a correlation between pictures is lost.

2. Description of the Related Art

As techniques for high-efficiently coding images, coding methods such as Moving Picture Experts Group Phase 2 (MPEG-2) are established. Electronics manufacturers are now developing and commercializing image capturing apparatuses such as digital cameras, digital video cameras and DVD recorders that can record images using the MPEG-2 coding method. Under such circumstances, users can readily reproduce images using such apparatuses as for example, personal computers, or DVD players.

In the MPEG-2 coding method, in order to efficiently transmit or store bit streams obtained by coding, code amount control (i.e., compressing the data to a predetermined code amount) is generally performed. Now, with respect to the code amount control in the MPEG-2 coding method, Test Model 5 (TM5), which is a reference soft encoder, will be described as an example. The TM5 is described in "Test Model Editing Committee: "Test Model 5," ISO/IEC, JTC/SC29/WG11/n0400 (April 1993).

The code amount control using the TM5 has following three steps. In the process of step 1, code amounts to be assigned to respective pictures in a group of pictures (GOP) are distributed to the pictures, based on a total code amount assignable to pictures that have not been coded in the GOP including the pictures to be assigned. This distribution process is repeatedly performed to coding target pictures in the GOP, in the order of coding.

In the process of step 2, in order to match the code amount assigned to each picture obtained in the above step 1 with an actually generated code amount, a following procedure is executed. That is, based on capacities of three types of virtual buffer units independently set for respective pictures I, P, and B, a quantization scale code is calculated performing feedback control for each macro-block.

In the process of step 3, at a flat portion where deterioration of the image is visually conspicuous, fine quantization is performed, and at a complicated pattern portion where deterioration is relatively inconspicuous, a rough quantization is performed. That is, the quantization scale obtained in step 2 is varied and determined using a variable called a normalized activity for each macro-block of 16×16 pixels.

The normalized activity calculation method and quantization scale determination method in step 3 will be described in detail below. A normalized activity representing the pattern complexity is calculated as follows: First, a macro-block of 16×16 pixels is divided into a total of eight blocks, (i.e., four 8×8 pixel blocks in a field discrete cosine transform mode, and four 8×8 pixel blocks in a frame discrete cosine transform mode). Then, an activity is calculated based on a variance value var_{sblk} of a luminance signal pixel value Pj of an original picture in each block. The variance value of 8×8 pixel block is calculated by:

$$\text{var\_\{sblk\}} = \sum_{j=1}^{64} (P_j - P)^2 \quad \left(P = \frac{1}{64}\sum_{j=1}^{64} P_j\right) \quad (1)$$

where P is an average pixel value of the luminance signal pixel values $P_j$ of the 8×8 pixel blocks.

From among the total eight variance values calculated by equation (1), a minimum variance value is found and an activity is calculated according to the following equation (2). The minimum value of the variance value is used in equation (2) to perform fine quantization in a case where a flat portion exists in a macro-block, even if the portion constitutes only a part of the block.

$$\text{act}=1+\min(\text{var\_}\{sblk\}) \quad (2)$$

The activity value act calculated by the equation (2) increases if the image of interest has a complicated pattern, that is, the variance of the luminance signal pixel values is larger. On the other hand, the activity value act decreases if the image of interest is flat, that is, the variance of the luminance signal pixel values is smaller. Further, by the following equation (3), a normalized activity N_act is calculated so that the activity value falls within a range 0.5 to 2.0.

$$N\_\text{act}=(2\times\text{act}+\text{pred\_avg\_act})/(\text{act}+2\times\text{pred\_avg\_act}) \quad (3)$$

In the average activity prediction method in TM5, a value of an average activity avg_act of a frame that is coded one frame before the coding target frame in a coding order is measured. The obtained value of an average activity avg_act is used as a predicted value of an average activity pred_avg_act of the coding target frames so as to perform normalization. Accordingly, significant variation of the normalization activity between the frames can be suppressed. If the activity is smaller than the average activity, the value of the normalization activity falls in the range 0.5 to 1.0. If the activity is larger than the average activity, the value falls in the range 1.0 to 2.0.

Based on the normalized activity N_act and the quantization scale code Qsc obtained in step 2, a quantization scale code MQUANT, in consideration of the visual characteristic according to the activity, is given by:

$$M\text{QUANT}=Qsc\times N\_\text{act} \quad (4)$$

That is, in the case of the flat image whose normalized activity N_act is smaller, the quantization scale code MQUANT becomes smaller and the image is finely quantized. On the other hand, in the case of the image having complicated pattern, and whose normalized activity N_act is larger, the quantization scale code MQUANT increases and the image is roughly quantized. The code amount control using the TM5 method is performed by the above-described processes.

In order to improve the coding efficiency in the MPEG-2 coding method, various approaches have been made. For example, Japanese Patent Laid-Open No. 8-18952, discusses a technique for improving coding efficiency. According to Japanese Patent Laid-Open No. 8-18952, in order to obtain a predicted value of the average activity to be used in the above equation (3) for calculating a normalized activity, an average activity of a coding target frame is predicted from a measured value of average activity of coded frames other than the coding target frame. Then, based on the predicted value of the average activity, the normalized activity is calculated.

However, in the above-described conventional average activity prediction methods, the average activity of the coding target frame is predicted from the measured value of the average activity of the coded frames other than the coding target frame. Accordingly, in a case where a correlation between the frame to be coded and an immediately preceding and/or following frame, is lost due to a flash light, the average activity is not predictable. Therefore, the quantization control is not appropriately performed.

SUMMARY OF THE INVENTION

The present invention is directed to predict an average activity appropriate for a coding target frame according to a change rate of an image so that a quantization control can be appropriately performed even if a correlation between images is lost.

According to an aspect of the present invention, an image coding apparatus performs code amount control by varying a quantization characteristic according to complexity of an input image pattern. The image coding apparatus includes a quantization unit configured to quantize input image data, a calculation unit configured to calculate an image change rate with respect to the input image data, a prediction unit configured to predict an average activity appropriate for a coding target picture that is included in the input image data based on the image change rate calculated by the calculation unit, a normalization unit configured to normalize an activity using the value of the average activity predicted by the prediction unit, and a quantization control unit configured to control the quantization performed in the quantization unit based on the activity normalized by the normalization unit.

According to another aspect of the present invention, an image coding apparatus is configured to perform code amount control by varying a quantization characteristic according to complexity of an input image pattern. The image coding apparatus includes a block division unit configured to divide a picture included in input image data into a plurality of image blocks, a quantization unit configured to quantize the image data for each image block divided by the block division unit, a calculation unit configured to calculate an image change rate for each image block divided by the block division unit, a prediction unit configured to predict an average activity appropriate for a coding target image block based on the image change rate of each image block calculated by the calculation unit, a normalization unit configured to normalize an activity using the predicted value of the average activity predicted by the prediction unit, and a quantization control unit configured to control the quantization of the coding target image block that is performed in the quantization unit based on the activity normalized by the normalization unit.

According to yet another aspect of the present invention, an image coding method for varying a quantization characteristic according to complexity of an input image pattern includes calculating an image change rate with respect to input image data, predicting an average activity appropriate for a coding target picture that is included in the input image data based on the calculated image change rate, normalizing an activity using the predicted value of the average activity, determining a quantization characteristic based on the normalized activity, and quantizing the input image data based on the determined quantization characteristic.

According to yet another aspect of the present invention, an image coding method for varying a quantization characteristic according to complexity of an input image pattern includes dividing a picture included in input image data into a plurality of image blocks, calculating an image change rate for each divided image block, predicting an average activity appropriate for a coding target image block based on the calculated image change rate of each image block, normalizing an activity using the predicted value of the average activity, determining a quantization characteristic of the coding target image block based on the normalized activity, and quantizing the image data for each divided image block based on the determined quantization characteristic.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram showing an exemplary configuration of an image coding apparatus according to an exemplary embodiment of the present invention.

FIGS. 10A, 10B, and 10C are views showing methods for calculating predicted values of average activities according to the TM5 method.

FIG. 11 is a view showing a relationship between average activity values and normalized activity values according to an exemplary embodiment of the present invention.

DETAILED DESCRIPTION OF THE EMBODIMENTS

Figure 2A:
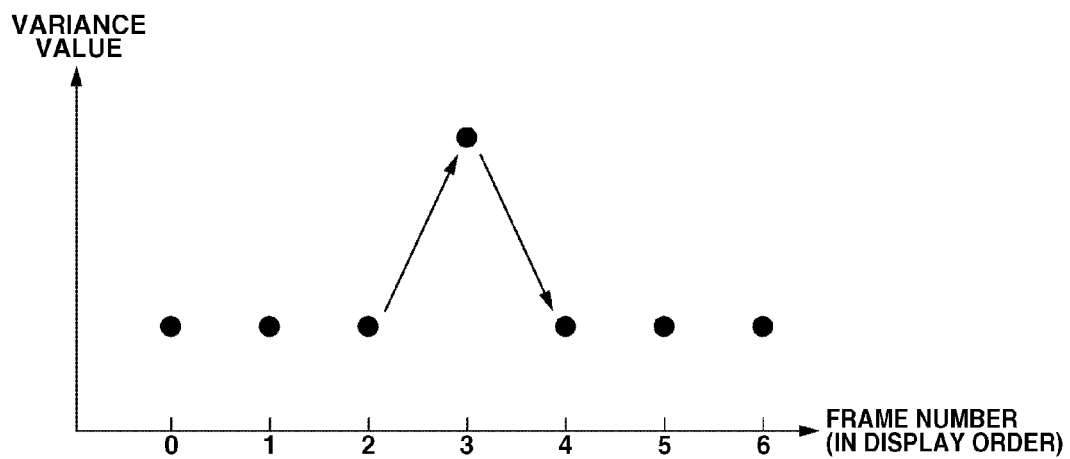
FIG. 2A is a view showing a variation of variance values in a case where a correlation between a frame and an immediately preceding and/or following frame is lost.

Various exemplary embodiments, features, and aspects of the invention will be described in detail below with reference to the drawings.

Before describing an exemplary embodiment of the present invention, the TM5 method as the background art will be further described below. As described before, in the TM5 method, in order to calculate a normalized activity, a value of an average activity of a frame that is located one frame before a coding target frame in a coding order is measured, and the measured value is used as a predicted value of an average activity. Accordingly, significant variation in the normalized activity between frames can be suppressed. However, in a case where patterns of an image largely vary between frames due to flash firing or a scene change, the average activity cannot be appropriately predicted. Accordingly, the quantization control is not appropriately performed.

Generally, when the flash lamp emits light, of two fields that form a frame, a luminance value of only one field image is varied by the flash firing. Then, as described above, the activity is calculated based on the minimum variance value of the four 8×8 pixel blocks in the field discrete cosine transform mode and the four 8×8 pixel blocks in the frame discrete cosine transform mode.

Usually, the variance values of the 8×8 pixel blocks in the frame discrete cosine transform mode become larger at the time of the flash firing since the luminance value of one of fields forming a frame varies due to the flash firing. The macro-blocks is expected to select a variance value in the frame discrete cosine transform mode as the minimum value from the variance values of the eight blocks if the flash does not emit light. However, in this case, the variance value in the field discrete cosine transform mode is selected as the minimum value.

Accordingly, as compared with the case where the flash lamp does not emit light, the activity calculated in each macro-block increases. As a result, the measured value of the average activity, that is, the average value of the activities in the frame at the time of the flash firing increases. Thus, it is highly possible that the prediction of the average activity is not correctly performed in the TM5 prediction method that uses the value of the average activity measured one frame before the target frame in the coding order, as the predicted value of the average activity.

In the case of scene change, the pattern of the frame image just before the scene change largely differs from the pattern of the image just after the scene change. Accordingly, the activities calculated based on the variance values largely differ from each other. As a result, the measured value of the average activity of the frame located just before the scene change also largely differs from the measured value of the average activity of the frame located just after the scene change. Accordingly, it is highly possible that the prediction of the average activity is not correctly performed in the TM5 prediction method that uses the value of the average activity measured one frame before the target frame in the coding order, as the predicted value of the average activity.

As an example, a stream formed by an I picture and P pictures shown in FIG. 10A will be described. FIG. 10B shows measured values of average activities actually calculated and variations of predicted values of average activities according to the TM5 prediction method in a case where only a correlation between a P3 picture and frames before and after the P3 picture is lost due to the flash firing. In FIG. 10B, a predetermined initial value is given as the predicted value of the average activity to an I0 picture, and the predicted value is not shown.

In FIG. 10B, a P1 picture and a P2 picture have correlations between respective immediately preceding frames in the coding order. Accordingly, errors between the values of the average activities predicted in the TM5 method and the measured values of the average activities actually calculated are small. However, at the P3 picture, due to the flash firing, the correlation between the P3 picture and the immediately preceding and following frames is lost. Accordingly, the measured value of the average activity actually calculated is increased at the P3 picture and decreased at the P4 picture.

In the TM5 prediction method, the value of the average activity measured one frame before the target frame in the coding order is used as the predicted value of the average activity. Therefore, at the P3 picture and the P4 picture, significant errors are generated between the measured values of the average activities and the predicted values of the average activities.

FIG. 10C shows a variation of the measured values of the average activities and the predicted values of the average activities in the TM5 prediction method in a case where a correlation between the P3 picture and the immediately preceding frame is lost due to a scene change. Similar to FIG. 10B, at the P3 picture, a significant error is generated between the measured value of the average activity actually calculated and the predicted value of the average activity in the TM5 prediction method.

Next, with reference to FIG. 11, an effect on a quantization is described which is brought by the error of the predicted value of the average activity. In FIG. 11, L1101 illustrates variations in normalized activities in a case where the P3 picture of FIG. 10C is normalized using a measured value of the average activity (avg_act=200) actually calculated.

L1102 of FIG. 11 illustrates a variation in normalized activities in a case where the P3 picture of FIG. 10C is normalized using a predicted value of the average activity (pred_avg_act=50) that is obtained by predicting the average activity in the TM5 prediction method.

For example, at an activity act=150, the activity normalized by the measured value of the average activity avg_act=200 (at point A) is "1.4." On the other hand, the activity normalized by the predicted value of the average activity pred_avg_act=50 (at point B) in the TM5 method is "0.9." The normalized activities at the two points largely differ from each other.

That is, the blocks are roughly quantized if the normalized activity is obtained using the measured value of the average activity. However, in the case of the normalized activity obtained using the value of the average activity predicted in the TM5 method, the blocks are finely quantized. Thus, if the normalization is performed using the activity predicted in the TM5 method, especially, in the case where the correlation between images is lost, an incorrect quantization step is set and accordingly, the quantization control is not appropriately performed.

FIG. 1 is a block diagram showing a configuration of an image coding apparatus 100 according to an exemplary embodiment of the present invention.

An image rearranging (reordering) unit 101 performs buffering of at least one frame and rearranges input image data in a coding order instead of a displaying order. A block division unit 102 divides the non-compressed image data into, for example, macro-blocks of 16×16 pixels. A subtracter 103 subtracts prediction image data from the input image data and outputs difference data of the remaining image. The generation of the prediction image data will be described below.

A discrete cosine transform unit 104 performs an orthogonal transformation of difference data of the remaining image output from the subtracter 103 and outputs a transformation coefficient. A quantization unit 105 quantizes the transformation coefficient based on a quantization scale output from each macro-block. The transformation coefficient quantized by the quantization unit 105 and motion vector information, which will be described below, are input to a variable length coding unit 106. The variable length coding unit 106 performs a variable length coding on the input transformation coefficient to make coded data. The coded data is temporally stored in a buffer unit 107 and the data is output later.

An image change rate calculation unit 115 receives the non-compressed data arranged in the displaying order and checks a correlation between at least two frames to calculate a change rate of the image. An average activity prediction unit 116 predicts an average activity appropriate for a coding target frame, based on the change rate of the image output from the image change rate calculation unit 115 and the measured average activity of the coded frame output from code amount control unit 114. Then, the average activity prediction unit 116 outputs the predicted average activity to the coding amount control unit 114.

The predicted value of the average activity is output from each block that calculates the quantization scale. The code amount control unit 114 performs normalization of the activity using the predicted value of the average activity. Then, the code amount control unit 114 outputs a quantization scale code and the quantization scale determined by the normalized activity, to the quantization unit 105. That is, the code amount control unit 114 controls the quantization performed in the quantization unit 105 based on the normalized activity. The quantization scale code is determined so that an overflow or an underflow of the data stored in the buffer unit 107 does not occur. The code amount control unit 114 also calculates an average activity of one frame and outputs the average as a measured value of the average activity to the average activity prediction unit 116.

The coefficient of transformation quantized in the quantization unit 105 is also used for generation of prediction image data. A dequantization unit 108 dequantizes the transformation coefficient quantized in the quantization unit 105. An inverse discrete cosine transformation unit 109 performs an inverse discrete cosine transformation of the transformation coefficient dequantized in the dequantization unit 108 and outputs the transformed data as decoded difference data of the remaining image.

An adder 110 adds the decoded difference data of the remaining image and the prediction image data, and outputs the obtained data as reconstructed image data. The reconstructed image data is recorded in a frame memory 111. The reconstructed data that can be referred to in the subsequent prediction is temporarily stored in the frame memory 111.

A motion compensation unit 112 performs motion compensation using the reconstructed image data stored on the frame memory 111 based on motion vector information detected by a motion detection unit 113, and generates prediction image data. The motion detection unit 113 detects a motion vector in the input image data and outputs the detected motion vector information to the motion compensation unit 112 and the variable length coding unit 106. An input unit 117 is configured to input non-compressed image data and an output unit 118 is configured to output coded data to a recording unit (not shown) or a transmission unit (not shown).

Next, the image change rate calculation unit 115 and the average activity prediction unit 116 are described in detail. First, the image change rate calculation unit 115 is described. The image change rate calculation unit 115 compares image characteristic amounts of at least two frames and calculates a change rate of the image. The calculation of the change rate of the image is performed on non-compressed image data arranged in the displaying order. The calculation of the change rate of the image can be performed before coding of a coding target frame is started, by buffering at least one frame using the image rearranging (reordering) unit 101 of FIG. 1. The change rate of the image is calculated, for example, using a variance of pixel values in the frame. Hereinafter, the calculation of the change rate of the image using the variance of pixel values in the frame will be described.

The variance of intra-frame pixel values is calculated by a following equation:

$$\mathrm{var} = \sum_{j=1}^{N} (P_j - P)^2 \qquad \left(P = \frac{1}{N}\sum_{j=1}^{N} P_j\right) \qquad (5)$$

where $P_j$ is a luminance signal pixel value in a frame, var is a variance value of the intra-frame pixel values, N is a total number of the intra-frame pixel values, and P is an average pixel value in the intra-frame pixel value $P_j$.

Generally, the larger the variance value, the more high-frequency components of the image, and the smaller the variance value, the more low-frequency components. Thus, a rough estimate of a pattern can be obtained. Accordingly, by comparing variance values of at least two frames, the change rate of the image can be calculated. As an example, a case where only a correlation at one frame is lost due to flash firing will be described with reference to FIGS. 2A and 2B.

FIG. 2A is a view showing a variation of variance values in a case where because of flash firing at a frame number 3, only a correlation between the frame number 3 and an immediately preceding frame and an immediately following frame is lost. Generally, when the flash lamp emits light, only a luminance value of one of two fields in one frame varies. Accordingly, as shown in FIG. 2A, the variance value of the frame number 3 becomes larger than values of the frame just before the frame number 3 and the frame just after the frame number 3.

Figure 2B:
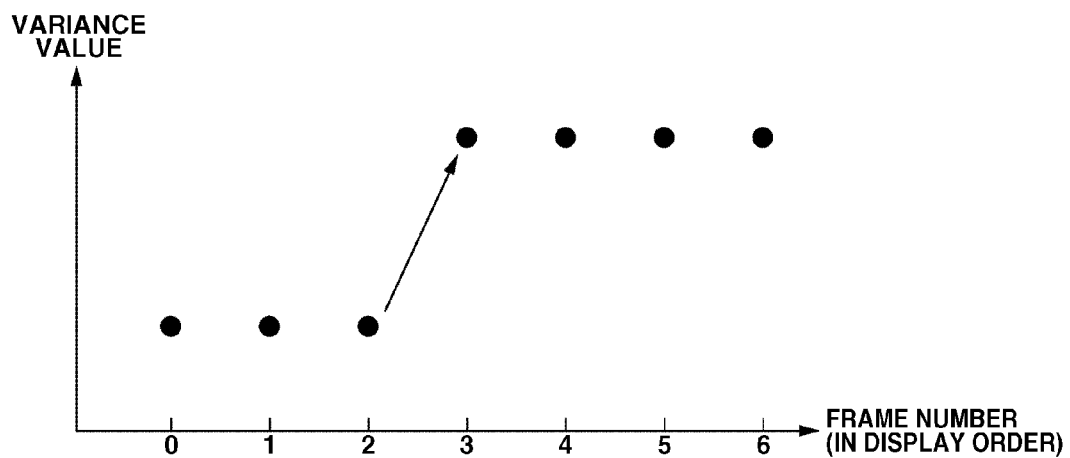
FIG. 2B is a view showing a variation of variance values in a case where a correlation between frames before a frame number 3 and frames after the frame 3 is lost.

FIG. 2B is a view showing a variation of variance values in a case where due to a scene change at the frame number 3, a correlation between the frames before the frame 3, and the frames after the frame number 3 is lost. If more high-frequency components are included in the frames after the frame number 3, as shown in FIG. 2B, the variance values of the frames after the frame number 3 become larger. On the other hand, if more low-frequency components are included in the frames after the frame number 3, the variance values of the frames after the frame number 3 become smaller (not shown).

The image change rate calculation part 115 calculates a change rate X of the image using the variation in the variance values of each frame, and outputs the calculated value to the average activity prediction unit 116. For example, an equation for calculating an image change rate of the frame number 3 and the frame number 2 is shown as follows.

$$X3,2 = f(\mathrm{VAR3},\mathrm{VAR2}) \qquad (6)$$

In the equation (6), VAR3 is a variance value of the frame number 3, and VAR2 is a variance value of the frame number 2. X3, 2 is an image change rate between the frame number 3 and the frame number 2, and is calculated as a function of the variance values of the frame number 3 and the frame number 2. The coding target frame and a frame arranged at least one frame before the coding target frame in the coding order are compared with respect to the variance value. An example of the function is shown by a following equation:

$$X3,2 = \mathrm{VAR3}/\mathrm{VAR2} \qquad (7)$$

If the variance value of the frame number 3 is larger than that of frame 2, the image change rate becomes larger than "1.0." If the variance value of the frame number 3 is smaller than that of frame 2, the image change rate becomes smaller than "1.0." If the variance value is not varied, it is considered that the image is not varied, and the image change rate becomes "1.0."

That is, in FIG. 2B, the image change rate X2, 1 is "1.0" since the variance value VAR2 of the frame number 2 and the variance value VAR1 of the frame number 1 are the same. If the image change rate falls within a predetermined range around "1.0," for example, from 0.8 to 1.2, in order to suppress a minute variation of the image change rate, it can be determined that the image is not varied and the image change rate can be considered to be "1.0." Since the minute variation of the image change rate is suppressed, as described below, a measured value of an average activity is varied according to the image change rate, and a predicted value of the average activity can be calculated only when the correlation between frames is significantly lost.

The image change rate can also be calculated based on variance of the intra-field pixel value. As described above, due to the flash firing, a luminance value of one of two fields in one frame varies. Generally, when the flash lamp emits light, in one field where the light is emitted, a luminance value of a part of the screen increases. Accordingly, the variance value of the field where the flash lamp emits the light becomes larger than the immediately preceding field and the immediately following field.

Thus, based on the calculated variance of the intra-field pixel values, as described in the equations (6) and (7), according to the ratio of the field variance values, the image change rate is calculated. In such a case, in the frame where the flash lamp emits the light, only the variance value of one of two fields varies. Accordingly, between the two image change rates of the sequential fields, the frame having larger image change rate can be used as a representative image change rate of the frame.

Next, the average activity prediction unit 116 is described. First, a calculation of a predicted value of an average activity in a stream formed only by an I picture and P pictures is described with reference to FIGS. 3A, 3B, 3C, 4A, 4B, and 4C.

Figure 3A:
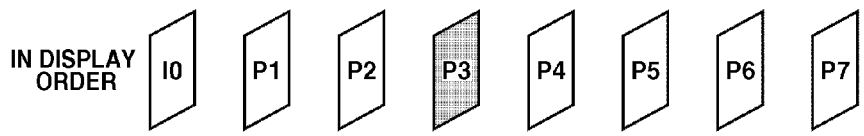
FIGS. 3A, 3B, and 3C are views showing calculation methods of predicted values of average activities according to an aspect of an exemplary embodiment of the present invention.

FIG. 3A illustrates a stream formed only by an I picture and P pictures, in a displaying order in a case where due to flash firing at a P3 picture, one frame loses a correlation with frames just after and before the P3 picture.

Figure 3B:
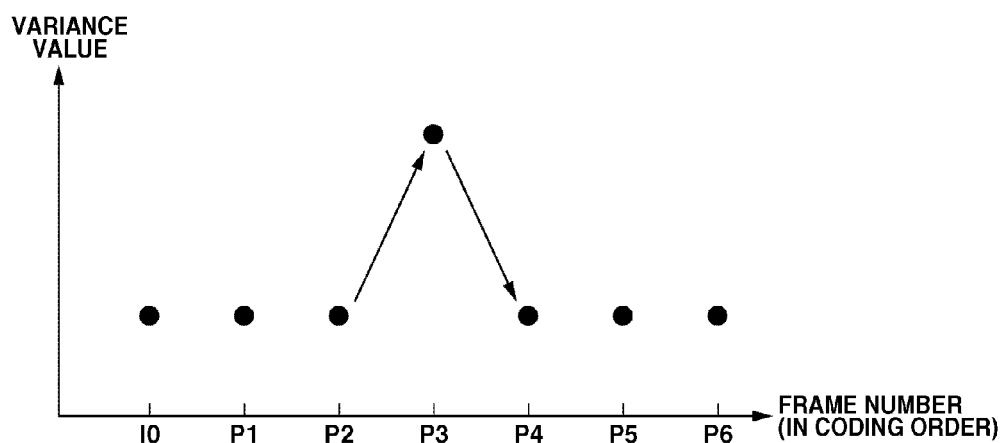
Figure 3C:
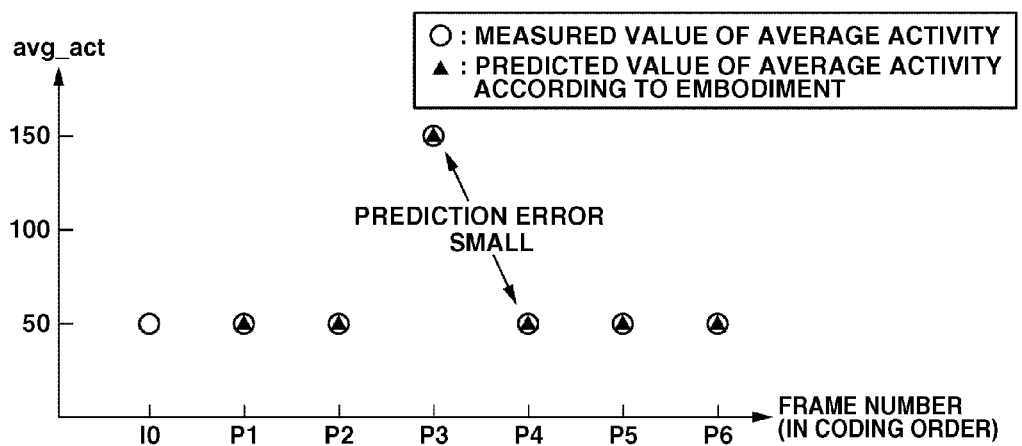

FIG. 3B illustrates a variation of variance values in coding the image data of FIG. 3A. FIG. 3C illustrates variations of predicted values of average activities according to the exemplary embodiment and measured values of average activities actually calculated in coding the image data of FIG. 3A. Since a predetermined initial value is given as a predicted value of an average activity of an I0 picture, the value is not shown in the drawing.

The average activity prediction unit 116 calculates a predicted value of an average activity of the coding target frame, based on the image change rate output from the above-described image change rate calculation unit 115 and the measured value of the average activity of the coded frame output from the code amount control unit 114. For example, due to the flash firing at the P3 picture, only one frame loses the correlation with frames just after and before the P3 picture. A calculation method of the predicted value of the average activity of the P3 picture in such a case will be described below.

As described above, in the case where due to the flash firing at the P3 picture, one frame loses the correlation with frames just after and before the P3 picture, only the variance value of the P3 picture increases. The average activity prediction unit 116 calculates the predicted value of the average activity. In the exemplary embodiment, the predicted value is calculated using an image change rate XP3P2 of the P3 picture and the P2 picture output from the image change rate calculation unit 115 and a measured value of the average activity AVG_ACTP2 of the coded frame located one frame before the coding target frame in the coding order. Then, a predicted value of the average activity PRED_AVG_ACTP3 is calculated by a following equation:

$$PRED\_AVG\_ACTP3 = AVG\_ACTP2 \times XP3P2 \quad (8)$$

That is, as the predicted value of the average activity, a value is used which is obtained by varying the measured value of the average activity of the frame located one frame before the coding target frame in the coding order, according to the image change rate. If the image change rate is larger than "1.0," a value larger than the measured value of the average activity is used as the predicted value of the average activity. If the image change rate is smaller than "1.0," a value smaller than the measured value of the average activity is used as the predicted value of the average activity.

Accordingly, in the prediction method according to the exemplary embodiment, prediction errors of the average activity is reduced as compared with the prediction method in the TM5 method that directly uses, as the measured value of the average activity, the measured value of the average activity of the frame located one frame before the coding target frame in the coding order. Thus, the normalization is performed using the average activity appropriate for the input image. In such a case, if the image change rate is "1.0," for example, (which is the case where the coding target frame is P1, P2, P5, or P6 of FIG. 3) the predicted value of the average activity is equal to the value of the average activity of the frame located one frame before the coding target frame in the coding order.

The calculation of the predicted value of the average activity PRED_AVG_ACT is performed for each frame. Then, the code amount control unit 114 normalizes the activities based on the predicted values of the average activities calculated for each frame and varies the quantization characteristics.

Further, as shown in the example of FIG. 3A, in the case where due to flash firing, only one frame of a P4 picture loses the correlation with frames just after and before the P4 picture, the P4 picture has a stronger correlation between the P2 picture than the P3 picture because a difference in the variance values between the P4 picture and the P3 picture is larger than a difference between the P4 picture and the P2 picture. Accordingly, a predicted value of the average activity PRED_AVG_ACTP4 can be calculated according to a following equation (9).

$$PRED\_AVG\_ACTP4 = AVG\_ACTP2 \quad (9)$$

That is, the average activity is not varied based on the image change rate X, but the average activity of the P2 picture that is located two frames before the target frame and has the stronger correlation with the picture 4, is used as it is, as the predicted value of the average activity PRED_AVG_ACT.

Figure 4A:
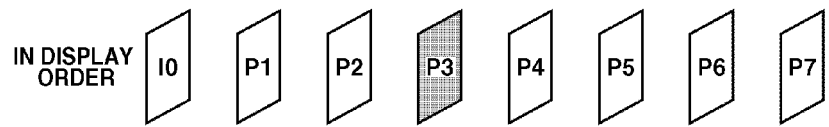
FIGS. 4A, 4B, and 4C are views showing methods for calculating predicted values of average activities according to an exemplary embodiment of the present invention.

FIG. 4A illustrates a stream formed only by an I picture and P pictures, in a case where due to a scene change, a correlation is lost in the vicinity of the P3 picture.

Figure 4B:
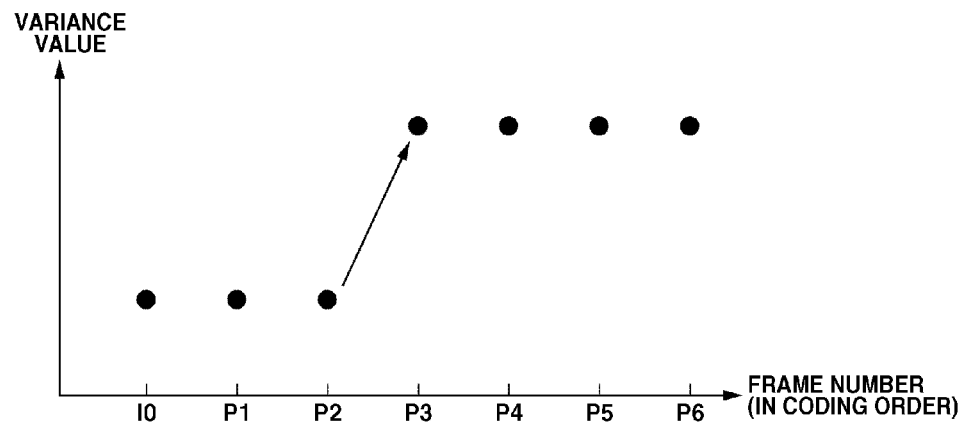
Figure 4C:
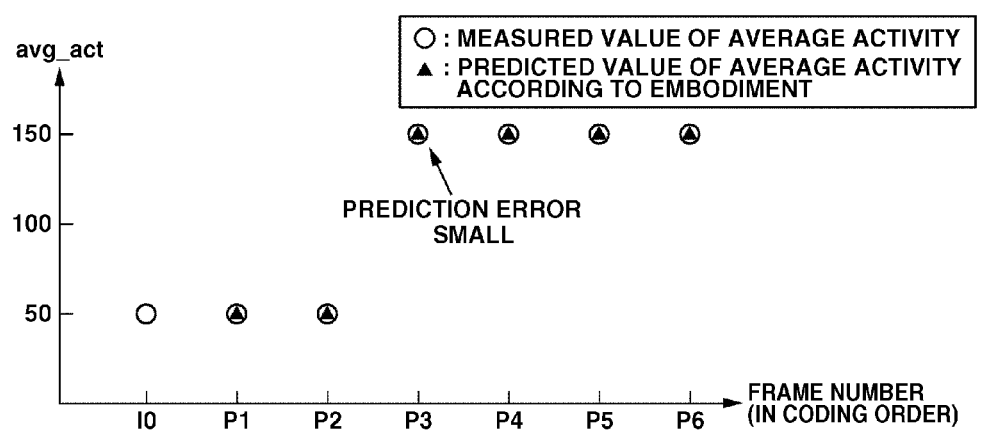

FIG. 4B illustrates a variation of variance values in coding the image data of FIG. 4A. FIG. 4C illustrates variations of predicted values of average activities and measured values of average activities actually calculated in coding the image data of FIG. 4A according to the exemplary embodiment. A predetermined initial value is given to a predicted value of an average activity of an I0 picture and therefore, is not shown in the drawing.

The average activity prediction unit 116 calculates a predicted value of an average activity of the coding target frame based on the image change rate output from the above-described image change rate calculation unit 115 and the measured value of the average activity of the coded frame output from the code amount control unit 114. For example, due to the scene change, the correlation is lost in the vicinity of the P3 picture. A method of calculating the predicted value of the average activity of the P3 picture in such a case will be described below.

As described above, in the case where due to the scene change, the correlation is lost in the vicinity of the P3 picture, the variance values subsequent to the P3 picture vary. For example, as shown in FIG. 4B, the variance values increase. The average activity prediction unit 116, similar to the above-described method, calculates the predicted value of the average activity PRED_AVG_ACTP3 using the image change rate XP3P2 of the P3 picture and the P2 picture output from the image change rate calculation unit 115 and the measured value of the average activity AVG_ACTP2 of the coded frame located one frame before the coding target frame in the coding order.

$$\text{PRED\_AVG\_ACT}P3 = \text{AVG\_ACT}P2 \times XP3P2 \quad (8)$$

That is, as the predicted value of the average activity, a value is used which is obtained by varying the measured value of the average activity of the frame located one frame before the coding target frame in the coding order, according to the image change rate. The calculation of the predicted value of the average activity PRED_AVG_ACT is performed for all frames. Then, the code amount control unit 114 normalizes the activities based on the predicted values of the average activities calculated for each frame.

Next, a method of calculating a predicted value of an average activity in a stream formed by an I picture, P pictures, and B pictures, is described with reference to FIGS. 5A, 5B, 5C, through FIG. 9. Descriptions overlapping with the above-described calculation of the predicted value of the average activity in the stream formed by the I picture and P pictures are not repeated.

Figure 5A:
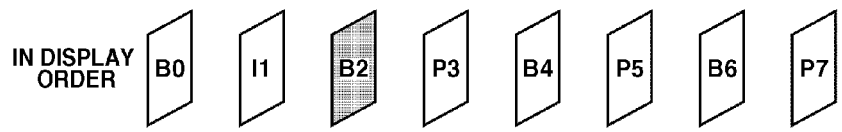
FIGS. 5A, 5B, and 5C are views showing methods for calculating predicted values of average activities according to an exemplary embodiment of the present invention.

FIG. 5A illustrates a stream formed by an I picture, P pictures, and B pictures and arranged in a displaying order in a case where due to flash firing at a B2 picture, one frame loses a correlation with frames just after and before the B2 picture.

Figure 5B:
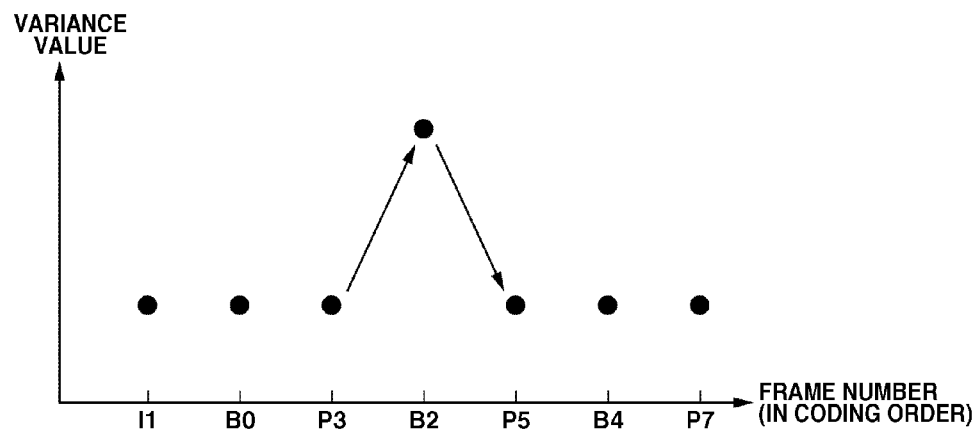
Figure 5C:
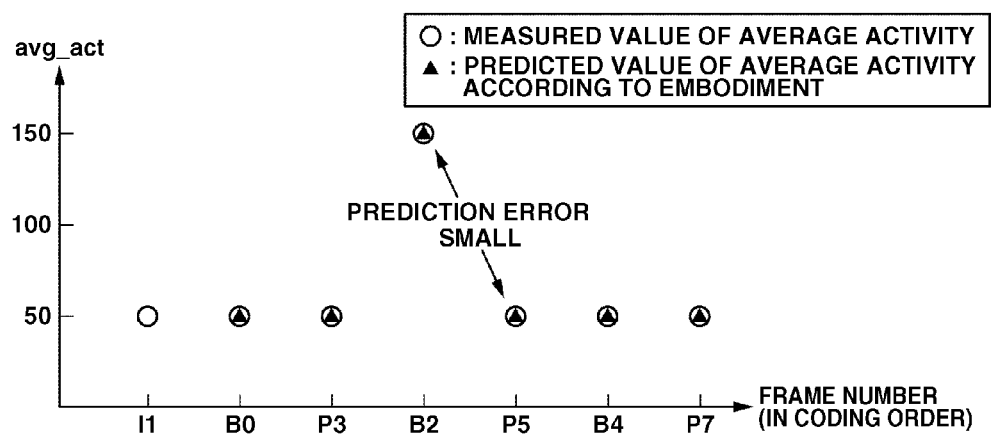

FIG. 5B illustrates a variation of variance values in coding the image data of FIG. 5A. FIG. 5C illustrates variations of predicted values of average activities and measured values of average activities actually calculated in coding the image data of FIG. 5A according to the exemplary embodiment.

The average activity prediction unit 116 calculates a predicted value of an average activity of the coding target frame based on the image change rate output from the above-described image change rate calculation unit 115 and the measured value of the average activity of the coded frame output from the code amount control unit 114. For example, due to the flash firing at the B2 picture, one frame loses the correlation with the frames just after and before the B2 picture. A method of calculating the predicted value of the average activity of the B3 picture in such a case will be described below.

The average activity prediction unit 116 calculates a predicted value of the average activity PRED_AVG_ACTB2 using an image change rate XB2P3 of the B2 picture and the P3 picture output from the image change rate calculation unit 115, and a measured value of the average activity AVG_ACTP3 of the coded frame located one frame before the coding target frame in the coding order, according to a following equation:

$$\text{PRED\_AVG\_ACT}B2 = \text{AVG\_ACT}P3 \times XB2P3 \quad (10)$$

Figure 6A:
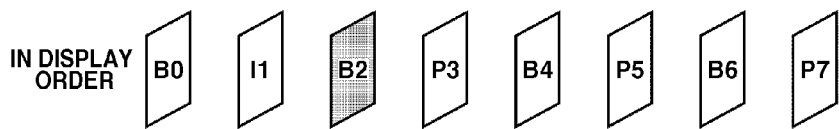
FIGS. 6A, 6B, and 6C are views showing methods for calculating predicted values of average activities according to an exemplary embodiment of the present invention.
Figure 6B:
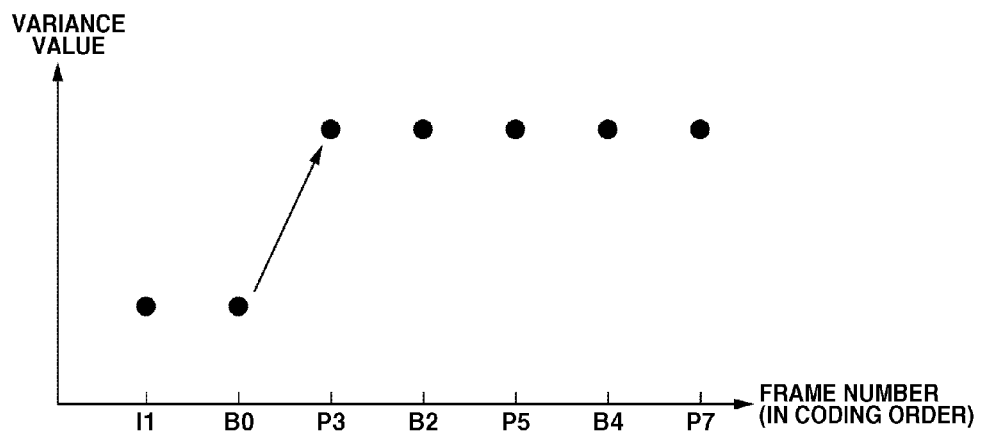
Figure 6C:
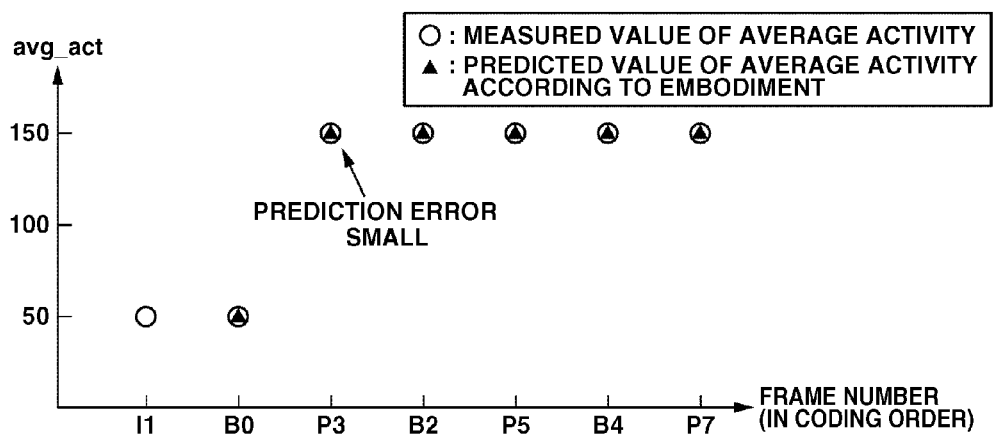

FIG. 6A illustrates a stream formed by an I picture, P pictures, and B pictures and arranged in a displaying order in a case where due to a scene change, a correlation is lost in the vicinity of the B2 picture. FIG. 6B illustrates a variation of variance values in coding the image data of FIG. 6A. FIG. 6C illustrates variations of predicted values of average activities and measured values of average activities actually calculated in coding image data of FIG. 6A according to the exemplary embodiment.

The average activity prediction unit 116 calculates a predicted value of an average activity of the coding target frame based on the image change rate output from the above-described image change rate calculation unit 115 and the measured value of the average activity of the coded frame output from the code amount control unit 114. For example, due to the scene change, the correlation is lost in the vicinity of the B2 picture. A method of calculating the predicted value of the average activity of the P3 picture in such a case will be described below. It is to be noted that since the image rearranging unit 101 rearranges the pictures in a coding order as shown in FIG. 6B, variance values vary from the P3 picture in the coding order.

The average activity prediction unit 116 calculates a predicted value of the average activity PRED_AVG_ACTP3 using an image change rate XP3B0 of the P3 picture and the B0 picture output from the image change rate calculation unit 115 and a measured value of the average activity AVG_ACTB0 of the coded frame located one frame before the coding target frame in the coding order, according to a following equation:

$$\text{PRED\_AVG\_ACT}P3 = \text{AVG\_ACT}B0 \times XP3B0 \quad (11)$$

Figure 7A:
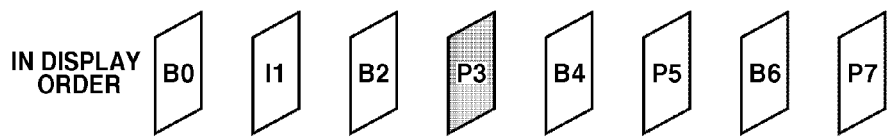
FIGS. 7A, 7B, and 7C are views showing methods for calculating predicted values of average activities according to an exemplary embodiment of the present invention.

FIG. 7A illustrates a stream formed by an I picture, P pictures, and B pictures and arranged in a displaying order in a case where due to flash firing at the P3 picture, one frame loses a correlation with frames just after and before the P3 picture.

Figure 7B:
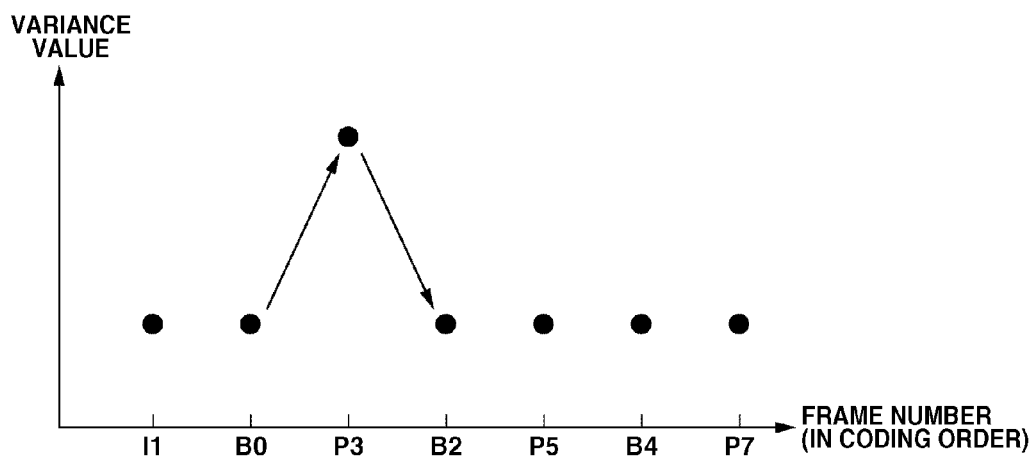
Figure 7C:
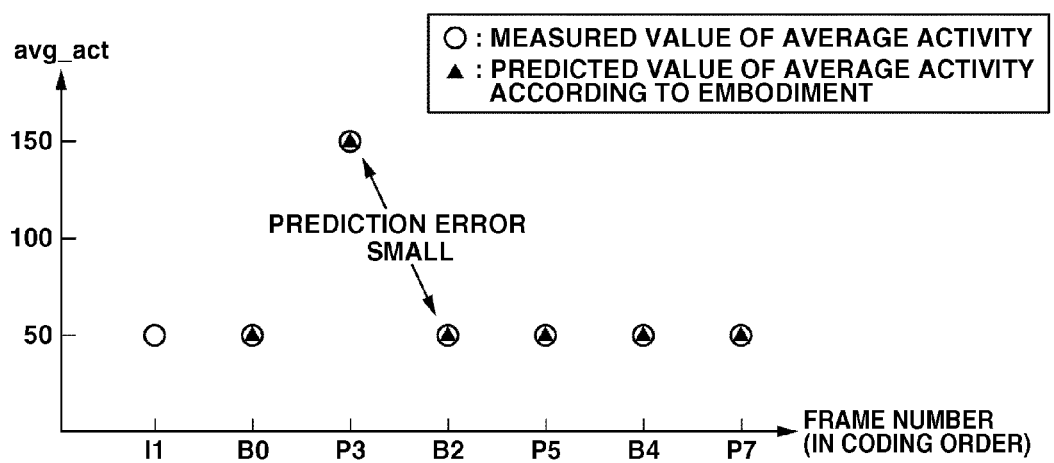

FIG. 7B illustrates a variation of variance values in coding the image data of FIG. 7A. FIG. 7C illustrates variations of predicted values of average activities and measured values of average activities actually calculated in coding the image data of FIG. 7A according to the exemplary embodiment.

The average activity prediction unit 116 calculates a predicted value of an average activity of the coding target frame based on the image change rate output from the above-described image change rate calculation unit 115 and the measured value of the average activity of the coded frame output from the code amount control unit 114. For example, due to the flash firing at the P3 picture, one frame loses the correlation with the frames just after and before the P3 picture. A method of calculating the predicted value of the average activity of the P3 picture in such a case will be described below.

The average activity prediction unit 116 calculates the predicted value of the average activity PRED_AVG_ACTP3 using the image change rate XP3B0 of the P3 picture and the B0 picture output from the image change rate calculation unit 115 and the measured value of the average activity AVG_ACTB0 of the coded frame located one frame before the coding target frame in the coding order, according to a following equation:

$$\text{PRED\_AVG\_ACT}P3 = \text{AVG\_ACT}B0 \times XP3B0 \quad (11)$$

Figure 8A:
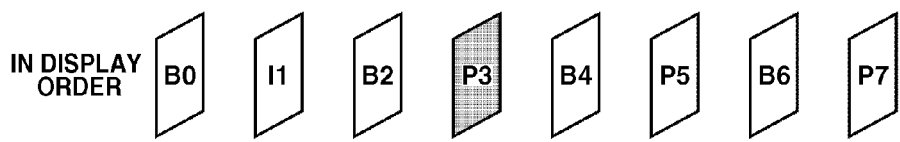
FIGS. 8A, 8B, and 8C are views showing methods for calculating predicted values of average activities according to an exemplary embodiment of the present invention.
Figure 8B:
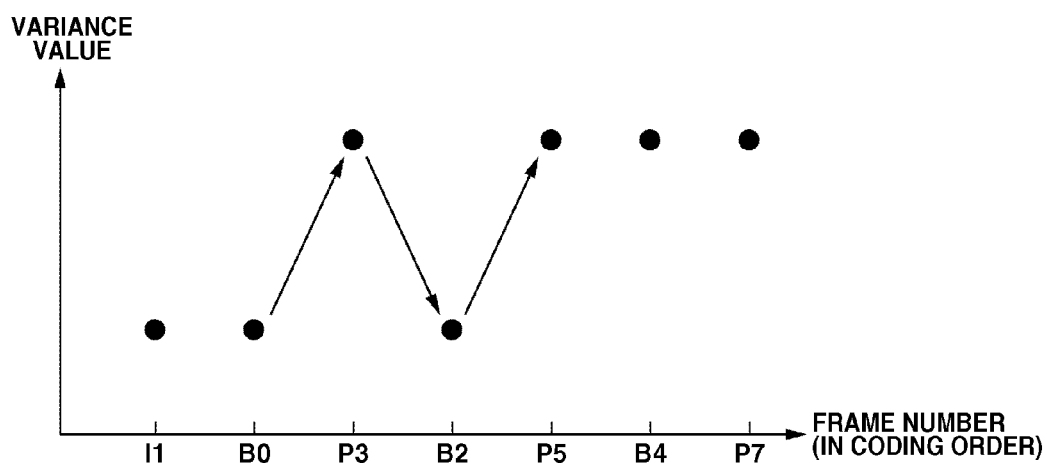
Figure 8C:
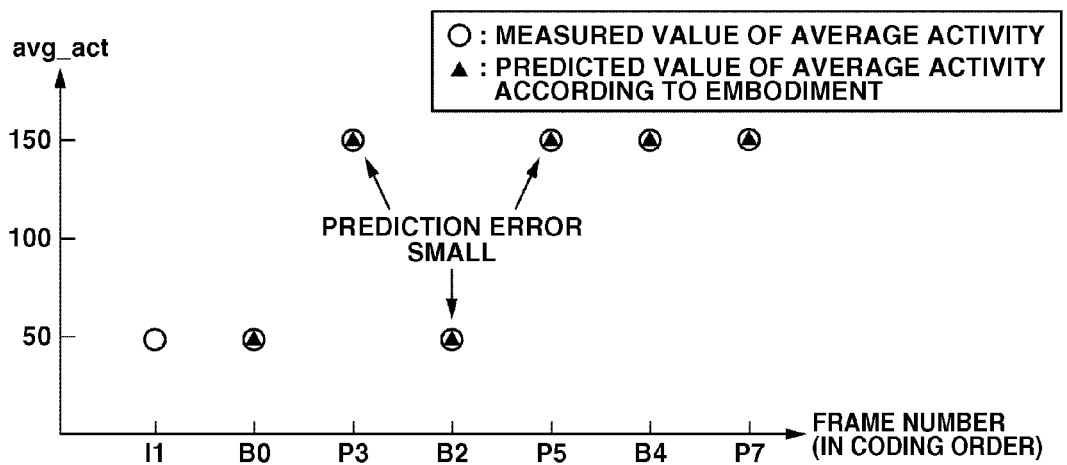

FIG. 8A illustrates a stream formed by an I picture, P pictures, and B pictures and arranged in a displaying order in a case where due to a scene change, a correlation is lost in the vicinity of the P3 picture. FIG. 8B illustrates a variation of variance values in coding the image data of FIG. 8A. FIG. 8C illustrates variations of predicted values of average activities and measured values of average activities actually calculated in coding the image data of FIG. 8A according to the exemplary embodiment.

The average activity prediction unit 116 calculates a predicted value of an average activity of the coding target frame based on the image change rate output from the above-described image change rate calculation unit 115 and the measured value of the average activity of the coded frame output from the code amount control unit 114.

For example, due to the scene change, the correlation is lost in the vicinity of the P3 picture. A method of calculating the predicted value of the average activity of the P3 picture in such a case will be described below. It is to be noted that since the image rearranging unit 101 rearranges the pictures in the coding order as shown in FIG. 8B, variance values vary at the P3 picture, the B2 picture, and the P5 picture in the coding order.

The average activity prediction unit 116 calculates the predicted value of the average activity PRED_AVG_ACTP3 using the image change rate XP3B0 of the P3 picture and the B0 picture output from the image change rate calculation unit 115 and the measured value of the average activity AVG_ACTB0 of the coded frame located one frame before the coding target frame in the coding order, according to a following equation:

$$PRED\_AVG\_ACTP3 = AVG\_ACTB0 \times XP3B0 \quad (11)$$

As described above, in normalizing the activity, in contrast to the TM5 prediction method, the measured value of the average activity of the frame located one frame before the coding target frame in the coding order is not used, as it is, as the predicted value of the average activity. For example, the measured value of the average activity of the frame located one frame before the coding target frame in the coding order is varied depending on the image change rate. Thus, the activity using the predicted value of the average activity appropriate for the input image can be normalized.

Further, in the case where due to the flash firing, one frame loses the correlation with the frames just after and before the frame is lost, the correlation between the frame just after the frame where the flash lamp emits the light and the frame just before the frame where the flash lamp emits the light, are strong. Accordingly, with respect to the frames just after and before the frame where the flash lamp emits the light in the coding order, as the predicted value of the average activity, the measured value of the average activity of the frame is used as it is which is located at least two frames before the frame where the flash lamp emits the light. Thus, the activity using the predicted value of the average activity appropriate for the input image can be normalized, and the quantization control can be appropriately performed.

Figure 9:
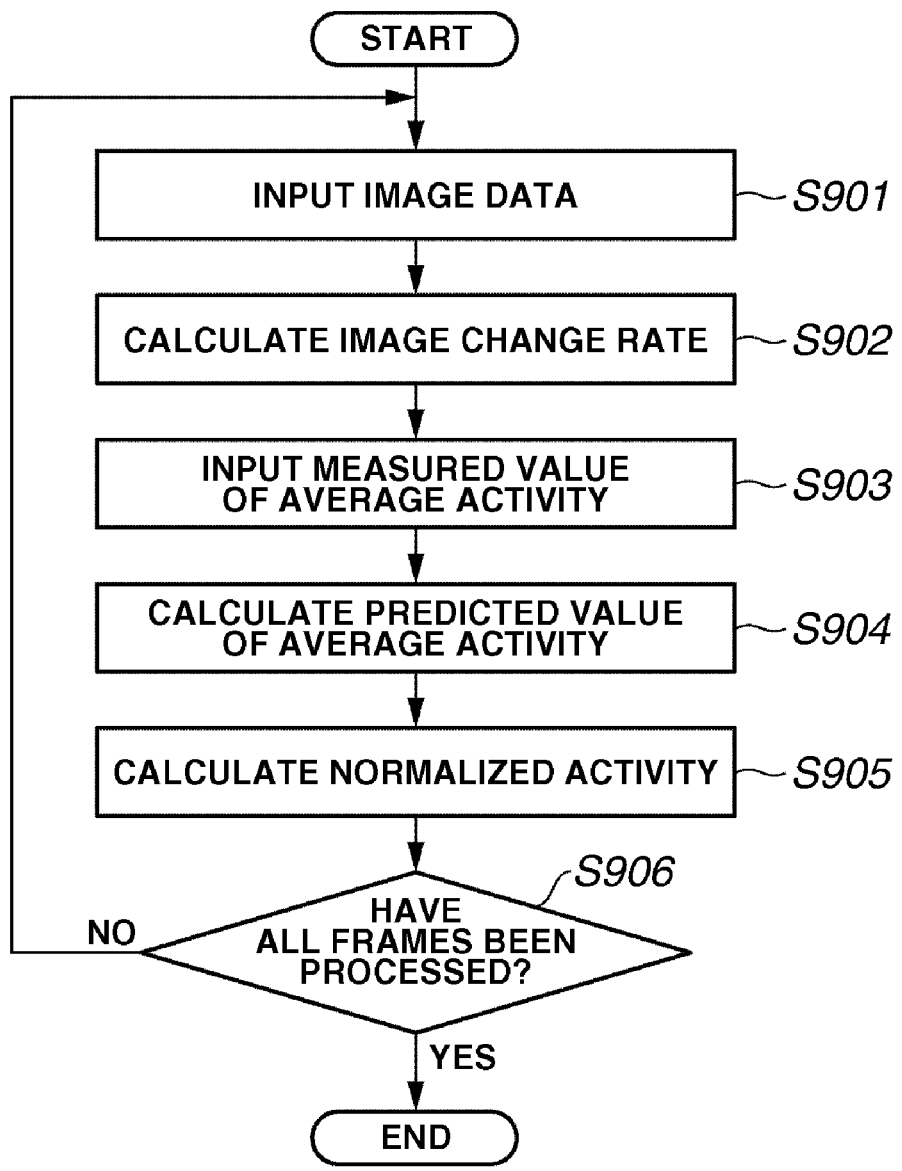
FIG. 9 is a flowchart showing a process for normalizing an activity according to a predicted value of an average activity according to an exemplary embodiment of the present invention.

Next, the descriptions in the above exemplary embodiment will be explained with reference to the flowchart of FIG. 9. FIG. 9 illustrates the step of predicting the average activity value based on the image change rate and the measured value of the average activity of the frame located one frame before the coding target frame in the coding order, and the step of normalizing the activity based on the predicted value of the average activity.

First, at step S901, non-compressed image data is input. Then, at step S902, using the above-described method, the image change rate calculation unit 115 calculates an image change rate from a variance value of a coding target frame and a variance value of a reference frame corresponding to a coded frame that an average activity is measured, and outputs the calculated value to the average activity prediction unit 116.

At step S903, the average activity prediction unit 116 inputs the measured value of the average activity of the coded frame output from the code amount control unit 114. At step S904, the average activity prediction unit 116 calculates a predicted value of the average activity using the above-described method based on the image change rate output from the image change rate calculation unit 115 and the measured value of the average activity of the coded frame output from the code amount control unit 114. Then, the average activity prediction unit 116 outputs the calculated predicted value to the code amount control unit 114.

At step S905, the code amount control unit 114 calculates a normalized activity based on the predicted value of the average activity according to the above-described equation (3). Then, at step S906, the processes of S901 to S905 are repeated for each frame, and normalized activities are calculated with respect to all frames. When the processes with respect to all frames are completed (YES at step S906), the flow is finished. If the processes are not completed (NO at step S906), the process returns to step S901.

The image coding apparatus 100 according to the exemplary embodiment predicts the average activity according to the correlation of the images between the frames calculated based on the input non-compressed image data. Then, the activity is normalized using the predicted value of the average activity appropriate for the coding target frame, and thus, the quantization control can be appropriately performed in real time. Accordingly, especially in the case where the correlation of the images is lost, the coding efficiency can be improved.

Each of the above-described units included in the image coding apparatus and each step of the image coding method according to the embodiment of the present invention can be implemented by executing a program stored on a RAM, ROM, or the like of a computer.

The present invention can be applied, for example, to a system, an apparatus, a method, a program, or a storage medium. More specifically, the present invention can be applied to a system including a plurality of devices or an apparatus including a device.

Further, a program (i.e., the program corresponding to the flowchart shown in FIG. 9 in the exemplary embodiment) of software implementing the functions of the above-described exemplary embodiment can be directly, or remotely provided to a system or an apparatus. Then, a computer in the system or the apparatus can read and execute the provided program code.

Accordingly, the program code itself that is installed on the computer implements the functions of the present invention.

In such a case, if the function of the program is implemented, any form can be employed as the program, for example, object code, a program implemented by an interpreter, and a script data to be supplied to an OS.

As the recording medium for supplying such program code, for example, a flexible disk, a hard disk, an optical disk, a magneto-optical disk (MO), a CD-ROM, a CD-R, and a CD-RW can be employed. Further, a magnetic tape, a non-volatile memory card, a ROM, and a DVD (DVD-ROM, DVD-R) can be employed.

In addition, the program can be supplied by connecting to a home page of the Internet using a browser of a client computer. Then, the program can be supplied from the home page by downloading the computer program of the present invention itself or a compressed file including an automatic installation function into a recording medium such as a hard disk and the like.

Further, the program code constituting the program according to the present invention can be divided into a plurality of files, and each file can be downloaded from different home pages. That is, a WWW server, an FTP server, and the like, which allow the program file for realizing the function processing of the present invention with the computer to be downloaded to a plurality of users, are also included in the claims of the present invention.

Further, the program according to the present invention can be encrypted and stored on a storage medium such as a CD-ROM, and distributed to the users. A user who has cleared prescribed conditions is allowed to download key information for decrypting from a home page through the Internet. Using the key information, the user can execute the encrypted program, and the program is installed onto the computer.

Further, the function according to the embodiments described above can be implemented not only by executing the program code read by the computer, but also based on an instruction according to the program code, an OS (operating system) working on the computer can execute a part or the whole of the actual processing to realize the function of the above described embodiments.

Further, the program code read from the storage medium can be written to a memory which is provided in a function enhancing board inserted in the computer or in a function enhancing unit connected to the computer. Then, based on an instruction according to the program code, the CPU or the like provided in the function enhancing board or in the function enhancing unit executes a part or the whole of the actual processing to realize the function of the above described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-174379 filed on Jun. 23, 2006, which is hereby incorporated by reference herein in its entirety.

What is claimed is:

1. An image coding apparatus configured to perform code amount control by varying a quantization characteristic according to complexity of an input image pattern, the image coding apparatus comprising:
   a quantization unit configured to quantize input image data;
   a calculation unit configured to calculate an image change rate with respect to the input image data;
   a prediction unit configured to predict an average activity appropriate for a coding target frame that is included in the input image data based on the image change rate calculated by the calculation unit;
   a normalization unit configured to normalize an activity using the value of the average activity predicted by the prediction unit; and
   a quantization control unit configured to control the quantization performed in the quantization unit based on the activity normalized by the normalization unit.

2. The image coding apparatus according to claim 1, wherein the calculation unit calculates a change rate between an input frame and a previously input frame, and the prediction unit predicts the average activity of the coding target frame based on the change rate with respect to the coding target frame calculated by the calculation unit, and an average activity of a coded frame that is located a predetermined number of frames before the coding target frame in a coding order.

3. The image coding apparatus according to claim 1, wherein the calculation unit further includes a variance value calculation unit configured to calculate a variance value of an intra-frame pixel value, and the calculation unit calculates the image change rate based on a variation of variance values of frames calculated by the variance value calculation unit.

4. The image coding apparatus according to claim 3, wherein the calculation unit calculates the image change rate based on the variance value of the coding target frame and a variance value of a reference frame referred to by the prediction unit when performing the prediction of the average activity of the coding target frame.

5. The image coding apparatus according to claim 4, wherein the prediction unit reduces the predicted value of the average activity of the coding target frame so that the average activity of the coding target frame becomes smaller than the reference frame in a case where the variance value of the coding target frame is smaller than the reference frame.

6. The image coding apparatus according to claim 4, wherein the prediction unit increases the predicted value of the average activity of the coding target frame so that the average activity of the coding target frame becomes larger than the reference frame in a case where the variance value of the coding target frame is larger than the reference-frame.

7. The image coding apparatus according to claim 4, wherein the prediction unit uses the predicted value of the average activity of the coding target frame as the average activity of the reference frame in a case where the variance value of the coding target frame is equal to the reference frame.

8. The image coding apparatus according to claim 7, wherein the prediction unit uses the predicted value of the average activity of the coding target frame as the average activity of the reference frame in a case where the variance of the variance values is less than or equal to a predetermined threshold.

9. The image coding apparatus according to claim 4, wherein the prediction unit changes the reference frame to predict the average activity of the coding target frame based on a correlation between the coding target frame and the previously input frame.

10. The image coding apparatus according to claim 9, wherein the prediction unit predicts the average activity of the coding target frame based on a measured average activity of a coded frame that is located at least one frame before the coding target frame in a coding order.

11. The image coding apparatus according to claim 10, wherein the prediction unit uses an average activity of a frame whose difference of a variance value from that of the coding target frame is smaller and that is located at least two frames before the coding target frame, as a predicted value of the average activity of the coding target frame in a case where a difference between the variance value of the coding target frame and that of a frame that is located one frame before the coding target frame is greater than or equal to a predetermined threshold, and, a difference between the variance value of the coding target frame and that of a frame that is located at least two frames before the coding target frame is less than or equal to the predetermined threshold.

12. An image coding apparatus configured to perform code amount control by varying a quantization characteristic according to complexity of an input image pattern, the image coding apparatus comprising:

a block division unit configured to divide a frame included in input image data into a plurality of image blocks;

a quantization unit configured to quantize the image data for each image block divided by the block division unit;

a calculation unit configured to calculate an image change rate for each image block divided by the block division unit;

a prediction unit configured to predict an average activity appropriate for a coding target image block based on the image change rate of each image block calculated by the calculation unit;

a normalization unit configured to normalize an activity using the predicted value of the average activity predicted by the prediction unit; and a quantization control unit configured to control the quantization of the coding target image block that is performed in the quantization unit based on the activity normalized by the normalization unit.

13. The image coding apparatus according to claim 12, wherein the image blocks divided by the block division unit are macro-blocks.

14. An image coding method for varying a quantization characteristic according to complexity of an input image pattern, the image coding method comprising:

calculating an image change rate with respect to input image data in an image coding apparatus;

predicting an average activity appropriate for a coding target frame that is included in the input image data based on the calculated image change rate;

normalizing an activity using the predicted value of the average activity;

determining a quantization characteristic based on the normalized activity; and quantizing the input image data based on the determined quantization characteristic.

15. An image coding method for varying a quantization characteristic according to complexity of an input image pattern, the image coding method comprising:

dividing a frame included in input image data into a plurality of image blocks in an image coding apparatus;

calculating an image change rate for each divided image block;

predicting an average activity appropriate for a coding target image block based on the calculated image change rate of each image block;

normalizing an activity using the predicted value of the average activity;

determining a quantization characteristic of the coding target image block based on the normalized activity; and quantizing the image data for each divided image block based on the determined quantization characteristic.

16. A non-transitory computer readable medium containing computer-executable instructions for an image coding method for varying a quantization characteristic according to complexity of an input image pattern, the medium comprising computer-executable instructions for:

calculating an image change rate with respect to input image data;

predicting an average activity appropriate for a coding target frame that is included in the input image data based on the calculated image change rate;

normalizing an activity using the predicted value of the average activity;

determining a quantization characteristic based on the normalized activity; and quantizing the input image data based on the determined quantization characteristic.

17. A non-transitory computer readable medium containing computer-executable instructions for an image coding method for varying a quantization characteristic according to complexity of an input image pattern, the medium comprising computer-executable instructions for:

dividing a frame included in input image data into a plurality of image blocks;

calculating an image change rate for each divided image block;

predicting an average activity appropriate for a coding target image block based on the calculated image change rate of each image block;

normalizing an activity using the predicted value of the average activity;

determining a quantization characteristic of the coding target image block based on the normalized activity; and quantizing the image data for each divided image block based on the determined quantization characteristic.

* * * * *